United States Patent [19]

Watanabe

[11] Patent Number: 4,604,974
[45] Date of Patent: Aug. 12, 1986

[54] AIR GUIDE ARRANGEMENT IN ENGINE ROOM

[75] Inventor: Takeaki Watanabe, Ebina, Japan

[73] Assignee: Nissan Motor Co., Ltd., Yokohama, Japan

[21] Appl. No.: 637,567

[22] Filed: Aug. 3, 1984

[30] Foreign Application Priority Data

Aug. 8, 1983 [JP] Japan .................................. 58-144723

[51] Int. Cl.⁴ ............................................... F01P 9/04
[52] U.S. Cl. .............................. 123/41.57; 123/41.18; 123/41.01; 237/12.3 A
[58] Field of Search ............... 123/41.05, 41.04, 41.07, 123/41.01, 41.11, 41.57, 41.18; 237/12.3 A; 98/2, 2.05

[56] References Cited

FOREIGN PATENT DOCUMENTS 1066684 1/1954 France ........................... 237/12.3 A Primary Examiner—Henry Bennett
Attorney, Agent, or Firm—Leydig, Voit & Mayer

[57] ABSTRACT

An air flow shutting member is removably disposed between the radiator and the engine so as to block the air flow which has passed through the radiator from contacting the engine. An air discharging structure is associated with the shutting member for smoothly discharging the air which has been blocked by the shutting member into the open air under the engine room.

4 Claims, 8 Drawing Figures

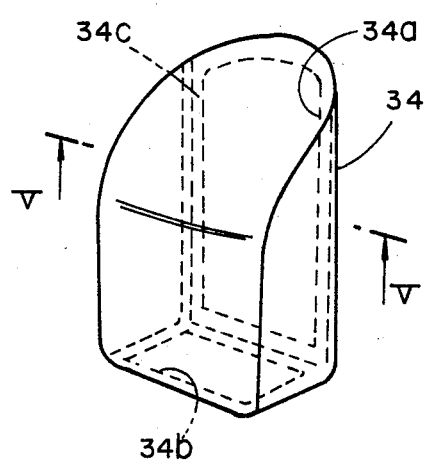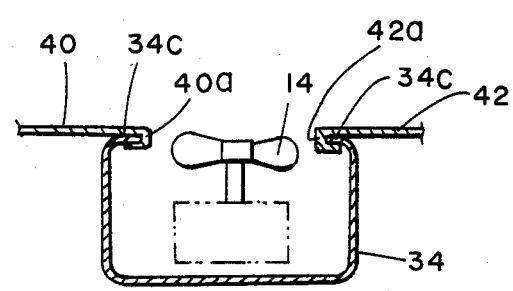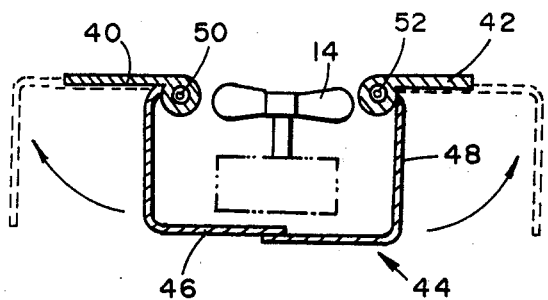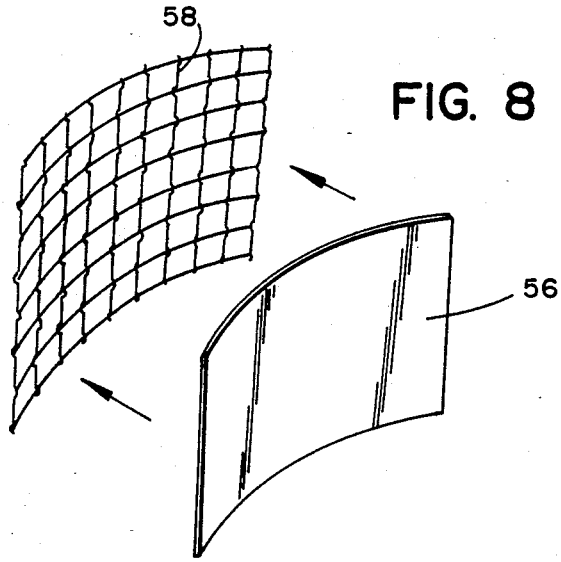

AIR GUIDE ARRANGEMENT IN ENGINE ROOM

BACKGROUND OF THE INVENTION

1. Field of the Invention

The present invention relates in general to an air guide arrangement in an engine room of a motor vehicle, and more particularly to an air guide arrangement which is designed to prevent over-cooling phenomenon of a water cooled engine.

2. Description of the Prior Art

In order to prevent over-cooling phenomenon of water-cooled engines in cold season, many attempts have been hitherto made. One of the widely employed measures to solve the undesired phenomenon is to attach an air shutting board to the front grill of the vehicle to block or restrict introduction of the natural air draft into the engine room. However, this measure causes not only an unsightly appearance of the vehicle but also remarkable drop in cooling performance of the engine cooling system because the air to be passed through the radiator is reduced. Thus, when the vehicle is under high load operation (such as, hill climbing) with the air shutting board attached thereto, engine overheating phenomenon tends to occur even in cold season. Two other conventional measures will be described hereinafter in order to clarify the background of the invention.

SUMMARY OF THE INVENTION

It is therefore an essential object of the present invention to provide an improved air guide arrangement in engine room, wnhich can solve the undesired phenomenon which has been encountered in the conventional measures to prevent overcooling of water-cooled engines.

According to the present invention, there is provided an improved air guide arrangement in an engine cooling arrangement in an engine room of a vehicle which arrangement includes an air intake grill through which open air is introduced into the engine room, a radiator located between the air intake grill and the engine permitting the air from the air intake grill to pass through the radiator before reaching the engine, and a motor-driven fan located in the vicinity of the radiator to positively produce air flow passing through the radiator. The air guide arrangement comprises an air flow shutting member removably disposed between the radiator and the engine to block the air flow, which has passed through the radiator, from contacting the engine, and air discharging means for smoothly discharging the air, which has been blocked by the shutting member, into the open air under the engine room.

BRIEF DESCRIPTION OF THE DRAWINGS

Other objects and advantages of the present invention will become apparent from the following description when taken in conjunction with the accompanying drawings, in which:

FIG. 4 is a perspective view of an air guide member used in the first embodiment;

FIG. 5 is a sectional view taken along the line V—V of FIG. 4;

FIG. 6 is a sectional view similar to FIG. 5 but showing an air guide member used in a second embodiment of the present invention;

FIG. 8 is an exploded view of an air guide member used in the third embodiment.

DESCRIPTION OF THE PRIOR ART

Figure 1:
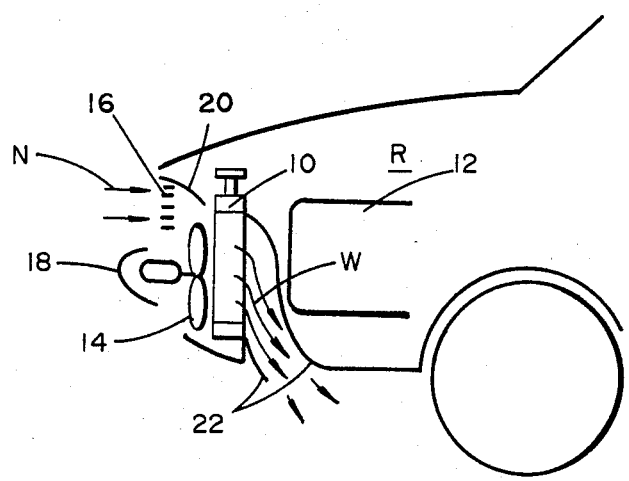
FIGS. 1 and 2 are drawings which respectively show prior art air guide arrangements in the engine room.
Figure 2:
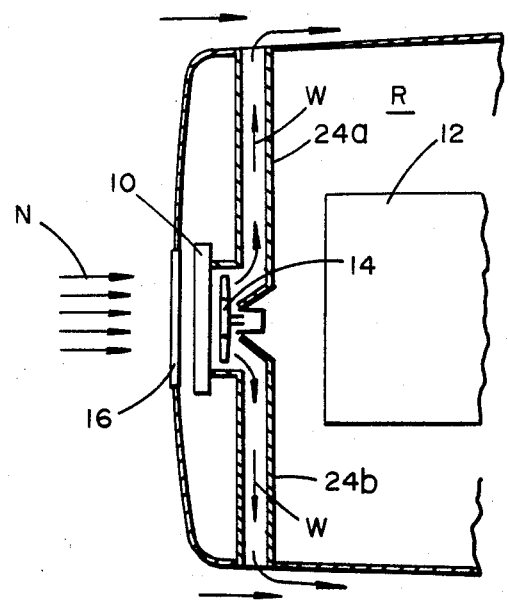

Prior to describing in detail the invention, other two prior art air guide arrangements will be outlined with reference to FIGS. 1 and 2 in order to clarify the background of the invention.

Referring to FIG. 1, there is shown one of the two arrangements, which is disclosed in Japanese Utility Model Application First Publication Sho 50-324. As is shown in the drawing, the arrangement is in cooperation with a conventional water-used engine cooling system which comprises generally a radiator 10 located in front of the engine 12 in the engine room R, and a motor-driven fan 14 located in front of the radiator 10. Designated by numeral 16 is a front grill through which the interior of the engine room R is communicated with the open air. The motor of the fan 14 is partially received in the front bumper 18 of the vehicle, as shown. The air guide arrangement comprises a shroud 20 located above the front grill 16 and an air guide passage 22 located between the radiator 10 and the engine 12. The shroud 20 has an air guide inner surface which is smoothly curved downward so that natural air draft N which has passed through the front grill 16 is directed toward the radiator 10. The air guide passage 22 extends from the inboard surface of the radiator 10 to an open section of the vehicle floor so that as is indicated by the arrows W, the air passing through the radiator 10 is directed toward the open air under the vehicle floor without blowing against the engine 12. With this arrangement, the undesired engine over-cooling phenomenon, which would occur particularly in cold seasons, is suppressed.

Referring to FIG. 2, there is shown the other prior art air guide arrangement, which is disclosed in Japanese Utility Model Application First Publication Sho 56-174321. As is shown in the drawing, the arrangement comprises two air guide passages 24a and 24b which extend from the inboard surface of the radiator 10 in the transversely opposed directions toward the lateral sides of the vehicle body. A motor driven fan 14 is located at the junction portion of the two air guide passages 24a and 24b so that the air which has passed through the radiator 10 is enforcedly driven to the open air through the passages 24a and 24b as is indicated by the arrows W. With this arrangement, the natural air draft N does not blow against the engine 12. Thus, the undesired engine over-cooling phenomenon does not occur.

However, as may be understood from their inherent constructions, these two arrangements tend to cause engine over-heating particularly in hot seasons because of lack of sufficient ventilation in the engine room R. That is to say, it is not easy to provide the engine room with an air guide arrangement by which both the overcooling phenomenon in cold season and the over-heating phenomenon in hot season of the engine are sufficiently suppressed.

DETAILED DESCRIPTION OF THE EMBODIMENTS

Figure 3:
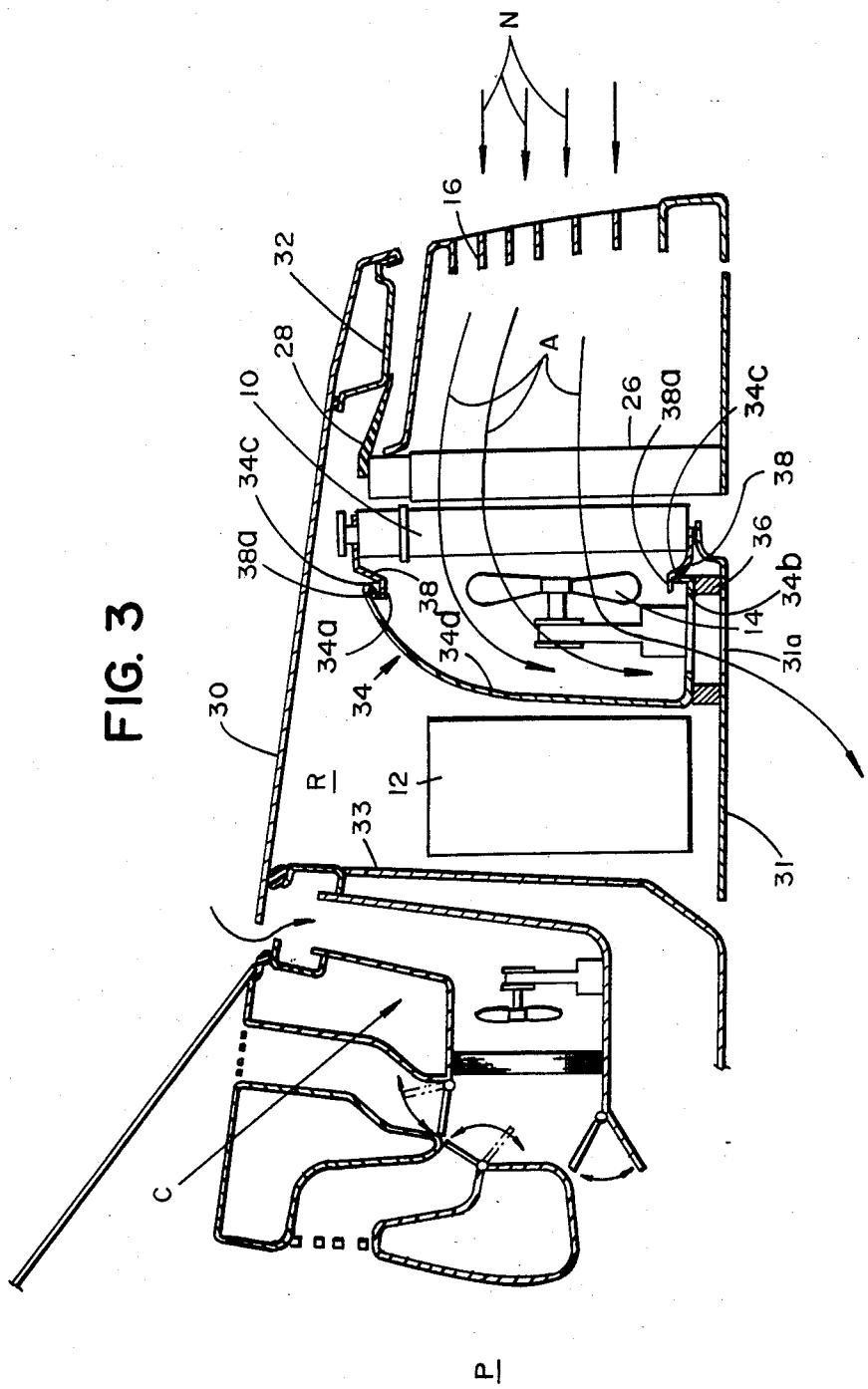
FIG. 3 is a sectional view of a front portion of a vehicle, showing an air guide arrangement of a first embodiment of the present invention.

Referring to FIG. 3 of the drawings, there is shown an air guide arrangement of a first embodiment of the present invention, which is in cooperation with a water-used engine cooling system mounted in the engine room R of a motor vehicle. The system comprises generally a radiator 10 which stands uprightly in front of the engine 12 and a motor-driven fan 14 which is located between the radiator 10 and the engine 12. A front grill 16 is located in front of the radiator 10, so that under cruising of the vehicle, the natural air draft N passes through the grill 16 and is directed toward the radiator 10. Designated by numeral 26 is a supporting member which supports the radiator 10 in a known manner. The engine room hood 30 is provided at its leading end with a reinforcing structure 32. A seal strip 28 is connected to and extends along the top of the supporting member 26, so that upon closing of the engine room hood 30, the seal strip 28 is in contact with the reinforcing structure 32. Designated by numeral 33 is a fire wall or bulkhead by which the engine room R and the passenger room P are bounded. Generally designated by reference C is an air flow control device by which the flowing direction of air introduced into the passenger room P is controlled. As the air flow control device C has not direct connection with the air guide arrangement of the invention, description of the device C will be omitted.

The air guide arrangement comprises a box-shaped air guide member 34 which is removably disposed between the engine 12 and the radiator 10 putting therein the motor-driven fan 14. As is seen from FIG. 4, the air guide member 34 has an essentially wedge-like profile and is formed with rectangular openings 34a and 34b through which air may enter and exit from the arrangement. As is seen from FIG. 3, the inlet opening 34a is formed in a vertical side which faces the inboard surface of the radiator 10. If deemed advantageous, the inlet opening 34a may be circular with a diameter approximately equal to that of the fan 14. The outlet opening 34b is formed in a horizontal side, which faces an opening 31a formed in an engine room undercover 31 which covers the bottom portion of the engine room R. The horizontal side of the air guide member 34 is seated on a supporter 26 which is secured to the undercover 31, and the peripheral edge portion 34c of the inlet opening 34a is removably engaged at its upper portion with a catching structure 38a of a radiator shroud 38 which frames the radiator 10. As is seen from FIG. 5, the peripheral edge portion 34c of the inlet opening 34a is removably engaged at its lateral sides with catching structures 40a and 42a of supports 40 and 42 which transversely extend and are secured to the side panels of the vehicle. The air guide member 34 is constructed of a material having a suitable flexibility. Thus, when unnecessary, the air guide member 34 can be removed from the illustrated position with a simple work. The air guide member 34 has a smoothly curved side 34d which is projected toward the engine 12, as shown.

Thus, during movement of the vehicle, the natural air draft N travels through the grill 16, the radiator 10 and the inlet and outlet openings 34a and 34b of the air guide member 34, that is, in the direction as indicated by the arrows A, and finally discharges into the open air through the opening 31a of the undercover 31. With the provision of the air guide member 34, the air which has passed through the radiator 10 does not blow against the engine 12, so that even under cruising in cold seasons, the engine over cooling phenomenon does not occur or is at least minimized so long as the air guide member 34 is in use. In hot seasons, the air guide member 34 is removed from the arrangement in order to prevent the engine over-heating. It is to be noted that the dismantling of the air guide member 34 can be easily achieved because of the above-mentioned detachable construction of the same.

Referring to FIG. 6, there is shown an air guide member 44 which is used in a second embodiment of the invention. That is, the member 44 is usable as a substitute for the above-mentioned air guide member 34. As shown, the air guide member 44 comprises generally two parts 46 and 48 which form double doors that open together on hinges. More particularly, the parts 46 and 48 have configurations which respectively correspond to the left and right halves of the air guide member 34 shown in FIG. 4, (that is to say, the halves which result from vertically sectioning the member 34). These parts 46 and 48 are pivotally connected at their one ends to the supports 42 and 44 through respective hinge structures 50 and 52, so that when they are closed together as shown in FIG. 6, they define an essentially wedge-shaped enclosure substantially the same as that shown in FIG. 4. Thus, in hot seasons, the two parts 46 and 48 are pivotally moved to the open positions as shown by broken line in FIG. 6.

Figure 7:
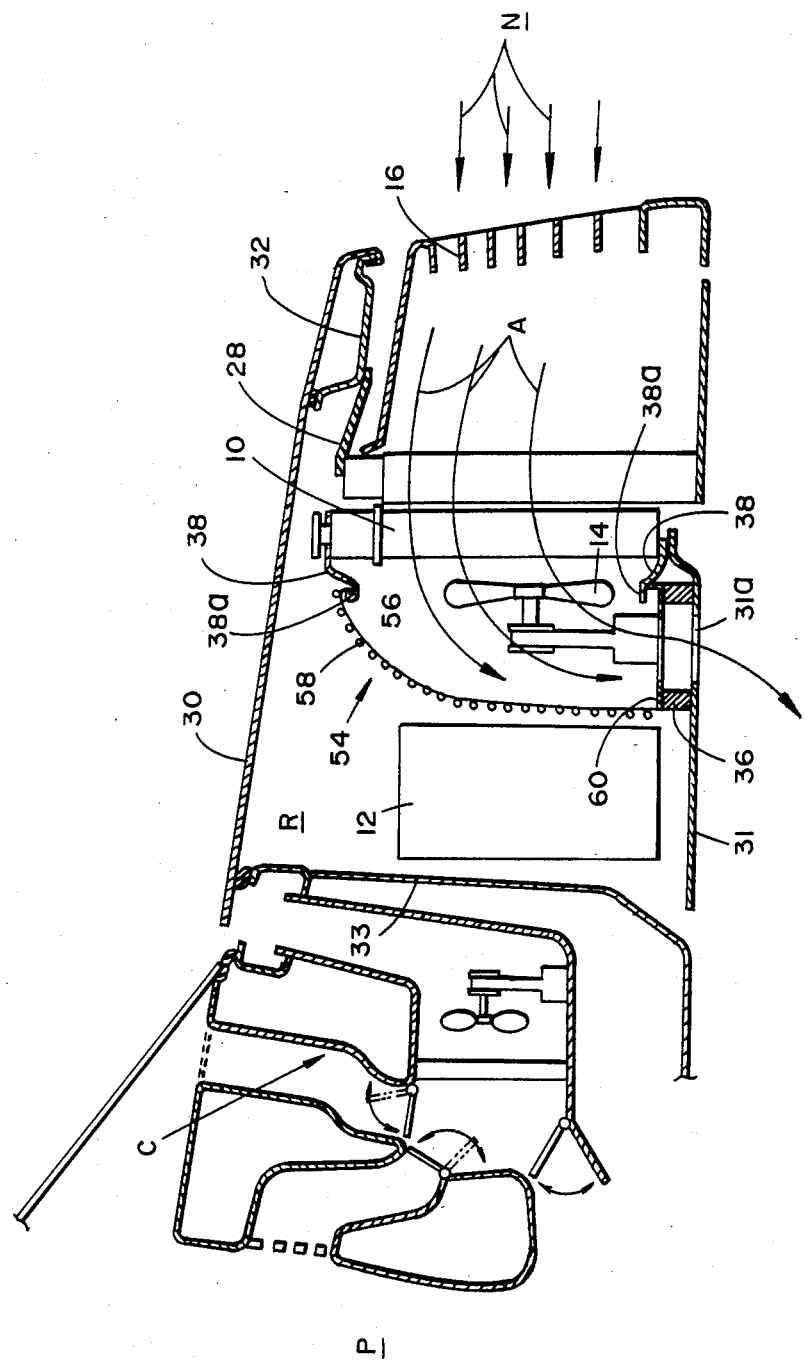
FIG. 7 is a view similar to FIG. 5, but showing a third embodiment of the present invention.

Referring to FIGS. 7 and 8, there is shown a third embodiment of the present invention. Since the construction and arrangement of the parts are substantially the same as those in the first embodiment of FIG. 3 except for the air guide member 54, detailed explanation of the same parts will be omitted from the following and the parts are designated by the same numerals and references.

The air guide member 54 used in this third embodiment comprises a flexible sheet 56 and a reinforcing wire mesh 58 which has a suitable resiliency. As is seen from FIG. 7, the wire mesh 58 is fixed at its upper portion to the catching structure 38a of the radiator shroud 38 and at its lower portion to a supporting plate 60 on which the motor-driven fan 14 is mounted. The wire mesh 58 is smoothly curved at its upper half portion, as shown. The flexible sheet 56 is intimately attached to the inboard surface of the wire mesh 58 with the peripheral portions thereof fixed to the wire mesh 58 by means of suitable clips (not shown). Thus, under moving of the vehicle, the natural air draft N which has passed through the front grill 16 travels in the direction as indicated by the arrows A, like the cases of the above-described first and second embodiments. In hot seasons, when the air guide member 54 becomes unnecessary, only the flexible sheet 56 is removed from the arrangement with the wire mesh 58 left in the arrangement, so that the natural air draft N which has passed through the radiator 10 can blow against the engine 12 through the wire mesh 58. Since the sheet 56 can be rolled or folled up small in size due to its flexibility, it can be put away in a limited space.

As is described hereinabove, in accordance with the present invention, there is proposed an air guide arrangement which can be easily moved either wholly or in part from the illustrated position wherein it blocks the flow of air moving to the engine, to a position wherein the air may impinge the engine. Since the air flow shutting means is positioned behind the radiator, the passage of cooling air through the radiator is hardly affected by the means thereby having substantially no effect on the cooling performance of the water-used engine cooling system per se.

What is claimed is:

1. In an engine cooling arrangement in an engine room of a vehicle, said arrangement including an air intake grill through which air is introduced into the engine room, a radiator located between said air intake grill and said engine permitting the air from said intake grill to pass through said radiator before reaching the engine and a motor-driven fan located in the vicinity of the radiator to positively produce air flow passing through said radiator, an air guide arrangement comprising:

an air flow enclosure member removably disposed on an undercover of the engine room between said radiator and said engine to divert and guide the air flow which has passed through the radiator from contacting the engine, said enclosure member including a box-shaped body of generally wedge-like profile, said body having an inlet opening in a vertical side which faces the inboard side of said radiator, an outlet opening in a horizontal side which faces said undercover and a smoothly curved portion for smoothly guiding the air flow from said inlet opening toward said outlet opening;

means for detachably connecting said enclosure member adjacent the inboard side of said radiator so that air flowing through said radiator is guided into said inlet opening, the detachable connecting means permitting the removal of said enclosure member from the engine room whereby when the enclosure is removed air flowing through said radiator contacts the engine; and means defining a discharging opening in said undercover of the engine room facing said outlet opening of the air flow enclosure member, so that the air from said outlet opening is discharged from said discharging opening into the open air under said engine room.

2. An air guide arrangement as claimed in claim 1 in which said horizontal side of the body is seated on a supporter which is secured to said undercover.

3. An air guide arrangement as claimed in claim 1 in which said motor driven fan is located in said box-shaped body.

4. An air guide arrangement as claimed in claim 1 in which the peripheral edge portion of the inlet opening is detachably engaged at its upper portion to a radiator shroud which frames the radiator and detachably engaged at its lateral sides with respective supports which transversely extend and are secured to the side panels of the vehicle to provide said detachable connecting means.

* * * * *